Oct. 6, 1964   J. J. BLACK   3,151,880
INTERCONNECTING UNIT FOR TANDEM HAULING OF SEMI-TRAILERS
Filed June 29, 1961   7 Sheets-Sheet 1

INVENTOR.
James J. Black
BY
Wood, Herron & Evans
ATTORNEYS

Oct. 6, 1964  J. J. BLACK  3,151,880
INTERCONNECTING UNIT FOR TANDEM HAULING OF SEMI-TRAILERS
Filed June 29, 1961  7 Sheets-Sheet 3

INVENTOR.
James J. Black
BY
Wood, Herron and Evans
ATTORNEYS

Oct. 6, 1964  J. J. BLACK  3,151,880
INTERCONNECTING UNIT FOR TANDEM HAULING OF SEMI-TRAILERS
Filed June 29, 1961  7 Sheets-Sheet 4

INVENTOR.
James J. Black
BY
Wood, Herron and Evans
ATTORNEYS

Oct. 6, 1964 J. J. BLACK 3,151,880
INTERCONNECTING UNIT FOR TANDEM HAULING OF SEMI-TRAILERS
Filed June 29, 1961 7 Sheets-Sheet 5

INVENTOR.
James J. Black
BY
Wood, Herron & Evans
ATTORNEYS

Oct. 6, 1964    J. J. BLACK    3,151,880
INTERCONNECTING UNIT FOR TANDEM HAULING OF SEMI-TRAILERS
Filed June 29, 1961    7 Sheets-Sheet 6

INVENTOR.
James J. Black
BY
Wood, Herron & Evans
ATTORNEYS

Oct. 6, 1964 J. J. BLACK 3,151,880
INTERCONNECTING UNIT FOR TANDEM HAULING OF SEMI-TRAILERS
Filed June 29, 1961 7 Sheets-Sheet 7

INVENTOR.
James J. Black
BY
Wood, Herron and Evans
ATTORNEYS

United States Patent Office 3,151,880
Patented Oct. 6, 1964

3,151,880
INTERCONNECTING UNIT FOR TANDEM HAULING OF SEMI-TRAILERS
James J. Black, Cincinnati, Ohio, assignor, by mesne assignments, to Pullman Incorporated, a corporation of Delaware
Filed June 29, 1961, Ser. No. 120,737
12 Claims. (Cl. 280—408)

This invention relates to improvements in apparatus for transporting goods, and more particularly the invention relates to improvements in articulated cargo carrying vehicles of the tractor drawn semi-trailer type.

A disadvantage of the well known tractor drawn semi-trailer is its inflexibility. The trailer is a big unit which may be from twenty to forty feet in length and is heavy, expensive, and of considerable storage capacity. Hauling cargo in a semi-trailer becomes economically advantageous principally when the hauling takes place over relatively long distances. Even when hauling is done over considerable distance, the twenty or forty foot semi-trailer may not be the most economical unit to be tractor drawn. Certain long stretches of super highways permit total trailer length of up to eighty feet but single units of such size are not otherwise practicable for use on secondary or feeder roadways.

Trailers approximately forty feet long are permitted over roads other than super highways. The forty foot semi-trailer however is not necessarily an economical unit in all cases. Much more desirable is a forty foot unit made up of two twenty foot units. The difficulty is that many states do not permit two units to be connected as double bottoms, that is, two trailers each fully supported and drawn in tandem.

The tracking problem is the apparent reason for the objection to two semi-trailers connected in tandem. The present connection of such semi-trailers in tandem requires three pivot points. The first is the engagement of the tractor lower fifth wheel with the upper fifth wheel of the adjacent trailer. The second is the connection of the interconnecting dolly to the first trailer and the third is the pivotal connection of the fifth wheel of the dolly to the upper fifth wheel of the tandem semi-trailer. Trailers so connected in tandem have an inherent danger arising from the uncontrolled or unconfined dolly tending to throw the trailers into a jack-knife when the rear trailer overrides the front trailer.

The states in which the tandem semi-trailer is illegal do permit the combination of a truck and four wheel trailer. In this combination, there are only two pivot points; namely, the pivot connection of the trailer draw bar to the truck and the kingpin connection of the forward wheels to the rear unit.

It has been an objective of my invention to provide apparatus for interconnecting two semi-trailers which will result in a combination which is the full equivalent of the truck and four wheel trailer combination insofar as the tracking problems are concerned. More specifically, it is an objective of my invention to provide an interconnecting unit, which I call an articulator, and cooperating chassis or cargo body structure, which permits two semi-trailers to be connected to a tractor for tandem hauling, the interconnection resulting in only two vertical pivot points. The articulator is a two wheel suspension which supports a fifth wheel, the articulator fifth wheel being adapted to cooperate with chassis or cargo body structure to provide pivotal or fixed support for the trailers.

The articulator of the present invention provides an improvement in the tracking of tandem connected trailer units and makes feasible the hauling of up to four twenty foot trailer units over long stretches of super highways. Such units can be picked up at the entrance to a super highway, hauled as an eighty foot train, and dropped at any super highway outlet. The train is divisible into four twenty foot units or two forty foot units, the smaller units being transported to and from the super highway in combinations permitted by the laws of the several states.

It has been another objective of my invention to provide a cargo container which is removable from its suspension, that is, the articulator, the container being suitable for transportation in ships and on railway flat cars as well as on the highways. By providing a cargo container having no dominant protuberances and which is readily mountable on and demountable from its suspension, considerable savings in stevedore time for loading and unloading and in reducing pilferage can be attained. The cargo containers can be economically stored in ship holds for ocean or Great Lakes transport. The containers can be transferred from ship holds to railway cars for railway transportation. The containers can be made up into trains of tractor drawn semi-trailers for highway transportation. Shifting from any one of the transportation media to another can be effected without requiring the unloading of the containers themselves.

In one form of the invention, a twenty foot container and integral chassis combination, for example, is provided with a fifth wheel at each end thereof and one set of landing gears which are foldable to lie substantially flush with the lower chassis-forming framework of the container. The absence of downwardly projecting structural elements makes this unit ideally suited for rail and sea transportation. The two fifth wheels permit the mounting of the container at one end thereof to a tractor and the supporting of the other end thereof by means of an articulator, the articulator being fixed against pivotal movement with respect to the container. Plural containers of this type can be combined into a train by adding articulators and interconnecting the articulators of adjoining containers.

A second form which the invention can take comprises a twenty foot chassis, for example, having a fifth wheel at each end thereof and having two sets of landing gears, one set being adjacent each fifth wheel. It is contemplated that this form of the invention will employ two ten foot containers or one twenty foot container detachably mounted to the chassis. The chassis will normally be supported at one end by the fifth wheel of the tractor and at the other end by an articulator of the type described above. Trains of containers can be made up by mounting the tandem chassis on two articulators and interconnecting the articulators of adjoining chassis.

The second form of the invention is somewhat more flexible than the first form described above. The use of the ten foot containers, or half size containers, permits the loading of cargo into smaller units which are easily shifted between the several transporting media and requires less non-paying space and weight than does the combined container and chassis described above.

Assuming that cargo containers which are approximately ten feet long and eight feet wide are used, four such containers can be mounted cross-wise on thirty-four foot flat cars. Further, because of the small size of the containers, the chassis may be equipped with conveyor systems which are suitable for shifting the containers to and from flat cars or loading docks.

The half size containers of the invention preferably are each provided with a door at one end thereof. When mounted on a chassis, the doors will face the respective ends of the chassis. Through the use of the articulators and the double landing gear support, the tractor can be mounted at either end of the chassis to expose the door of the container at the opposite end of the chassis; and can easily be disconnected and positioned at the other end of the chassis to expose the door of the other container.

Thus the second form of the invention provides great flexibility through the utilization of three standard units; namely, a single chassis, a single type of articulator, and one container design which may be the full length of the chassis or half the length of the chassis.

The common keystone of the two forms of the invention described above is the articulator. It has been therefore an objective of the invention to provide an articulator suspension for a trailer which may be positioned in supporting engagement with a chassis and when in that supporting position may be selectively rigidly fixed to the chassis or alternatively connected for pivotal movement with respect to the chassis about a vertical axis. Additionally, each articulator is provided with means on at least one end thereof by which connection can be made to a similar or identical articulator. That connection is such as to prevent pivotal movement of the articulators with respect to each other about a vertical axis. Still another objective of the invention, in respect to the articulators, is to provide for the movement of articulator joined chassis with respect to each other in a vertical plane to accommodate undulating contours in the highways.

The several features of the invention will become more readily apparent from the following detailed description taken in conjunction with the accompanying drawings in which.

Figure 1:
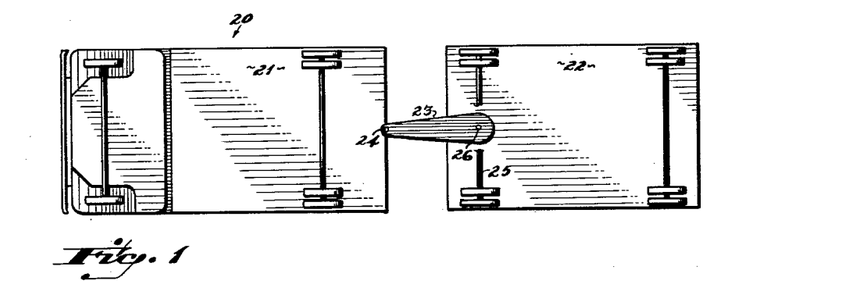
FIG. 1 is a diagrammatic bottom plan view of a truck and four wheel trailer combination.
Figure 2:
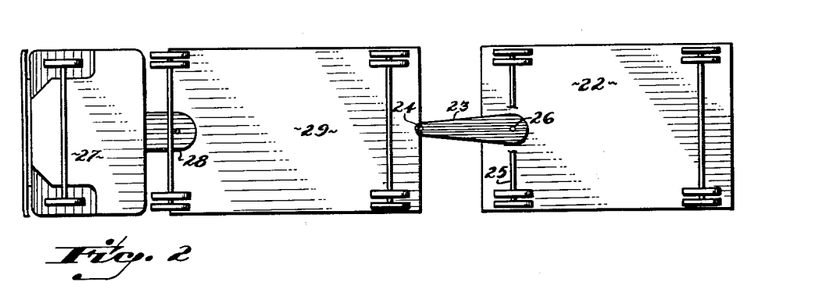
FIG. 2 is a diagrammatic bottom plan view of a semi-trailer and four wheel trailer combination.
Figure 3:
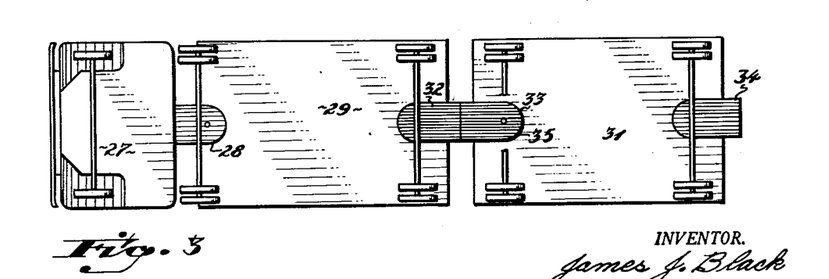
FIG. 3 is a diagrammatic bottom plan view of a train of two semi-trailers in accordance with the present invention.

Three different types of train interconnections are shown in FIGS. 1, 2 and 3 to illustrate a part of a problem to which the present invention is directed.

FIG. 1 shows a truck 20 having a cargo container 21 which is rigidly mounted with respect to the chassis of the truck. A four wheel trailer 22 is connected to the truck by a draw bar 23 pivoted at 24 to the truck and fixed to the forward axles 25 which are in turn pivoted at 26 to the trailer. The train connection of FIG. 1 is not subject to legal difficulties insofar as the various state laws are concerned.

In FIG. 2, however, there is shown a train connection which is illegal in many states. In the train of FIG. 2 a tractor 27 is connected through a fifth wheel mechanism 28 to a semi-trailer 29. The four wheel trailer 22 is connected as in FIG. 1 to the semi-trailer 29 through the draw bar 23 having the pivot point 24 and 26. The combination of axle 25 and draw bar 23 with the double pivot points 24 and 26 is considered to be an uncontrollable dolly. Under certain conditions when the tractor 27 and semi-trailer 29 are turning in one direction, the four wheel trailer begins to swing in an opposite direction because of the two pivot points at 24 and 26 and the third pivot point at the fifth wheel 28. Because of the inherent dangers in the uncontrolled dolly, the connection of FIG. 2, as in the case above, is considered to be illegal in many states.

Through the utilization of the present invention, the advantages of employing the semi-trailer of FIG. 2 can be attained while maintaining the safety requirements of the truck and four wheeled trailer connection of FIG. 1. In FIG. 3 a tractor 27 draws a semi-trailer 29 through the fifth wheel 28 as described above. The semi-trailer 29 is supported at the rear by a fixed articulator 32 above. A second semi-trailer 31, supported by a pivoted articulator 33 at the forward end and by a fixed articulator 34 at the rearward end, is connected to the first semi-trailer 29 by the interconnection of the adjoining articulators.

This interconnection of semi-trailers illustrated in FIG. 3 eliminates the hazardous dolly and provides a train which, like the train of FIG. 1, has only two suspension pivot points. The first point is at the tractor fifth wheel 28 and the second is at the pivoted articulator 33 on the second semi-trailer 31.

Figure 4:
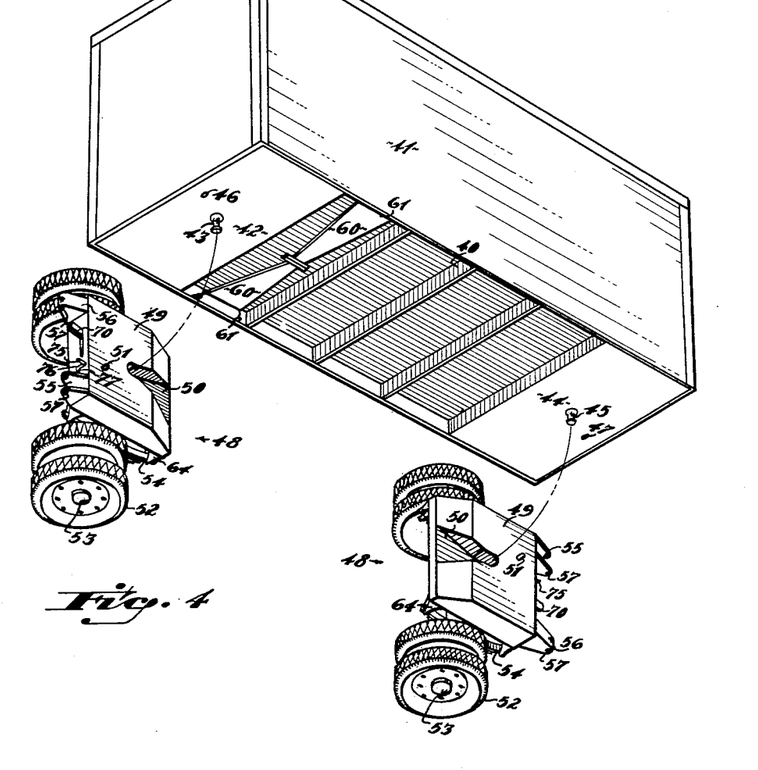
FIG. 4 is a disassembled perspective view of one form of the invention.

One form of my invention by which a train such as is shown in FIG. 3 can be made up is illustrated in FIG. 4. A chassis 40 has a container 41 integral therewith.

It should be understood that the term "chassis" means a support or frame at the base of the cargo container whether it is separable from or integral with the container, and includes the light flexible frame which becomes rigid when connected to the side walls of a container.

An upper fifth wheel 42 having a kingpin 43 is built into the forward end of the chassis. At the rearward end of the chassis another fifth wheel 44 having a kingpin 45 is built into the chassis. Locking holes 46 and 47 are provided in the respective upper fifth wheels 42 and 44. The upper fifth wheels 42 and 44 are adapted to receive identical articulators 48. Each articulator has a lower fifth wheel 49 having a slot 50 in which to capture a kingpin. An elevatable pin 51 is mounted in the lower fifth wheel structure and is actuatable to project above the surface of the fifth wheel or to drop down below the surface of the fifth wheel. The pins 51 cooperate with the holes 46 or 47 to selectively lock the articulator with respect to the upper fifth wheel or alternatively to permit free pivotal action of the articulator about the kingpin 43.

Each articulator has two sets of wheels 52 which are mounted on axles 53, the axles being journalled in an axle housing fixed to springs 54 which are in turn mounted to the lower fifth wheel structure 49. The fifth wheel 49 of the articulator 48 has at one end thereof a female connector 55 and a male connector 56. When two articulators are aligned with their connectors facing each other, the respective male connectors are received within the female connectors and locked by means of pins passing through holes 57.

Support of the container 41 and chassis 40 is normally provided by the articulators 48. However, as will appear below, it is necessary from time to time to remove the forward articulator and substitute a tractor for support. During the substitution, support for the forward end of the container is provided by the landing gears 60 which are hinged to the chassis as at 61 and which, when not in use, fold within the chassis frame. Another set of landing gears may be provided at the rearward end of the chassis as desired.

Figure 5:
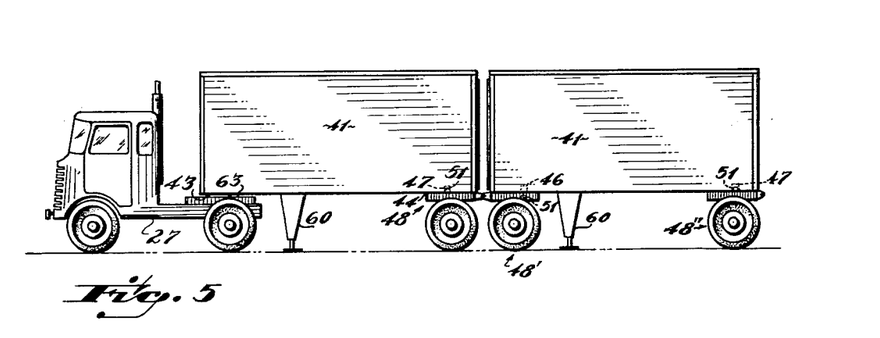
FIG. 5 is a side elevational view of a train formed in accordance with the present invention.

The apparatus of FIG. 4 can be cade up into a train of the type shown in FIG. 3 by interconnection of articulators as illustrated in FIG. 5. There a tractor 27 having a lower fifth wheel 63 supports the forward end of the container 41 through the engagement of its fifth wheel 63 with the container fifth wheel and kingpin 43. Free pivotal movement between the chassis of container 41 and the tractor 27 is permitted. During the connecting of the fifth wheel of the tractor to the container 41, the container is supported by the foldable landing gear 60.

The rearward fifth wheel of the container 41 is supported by an articulator 48. The pin 51 of the rearward articulator 48 is elevated to bring it into engagement with the hole 47 of the container upper fifth wheel 44. Through this pin and hole connection, rotation of the articulator 48 with respect to the container 41 is blocked.

A second articulator 48' is provided to support the forward end of a second container 41. The male and female connectors of the adjacent articulators are secured together to fix the two articulators in alignment so that they cannot pivot with respect to each other. The second articulator 48' has its pin 51 retracted so that free pivotal movement of the container chassis with respect to the articulator 48' is permitted.

The rearward end of the second container is supported by an articulator 48' which has its pin 51 elevated to block rotation of the articulator with respect to the container chassis.

Through the selective engagement of the pins 51 on the articulators with the respective holes 46 and 44, a train with the desired two pivot points is provided. Two pivot points occur at the location of the tractor fifth wheel 63 and the articulator 48' respectively.

Figure 6:
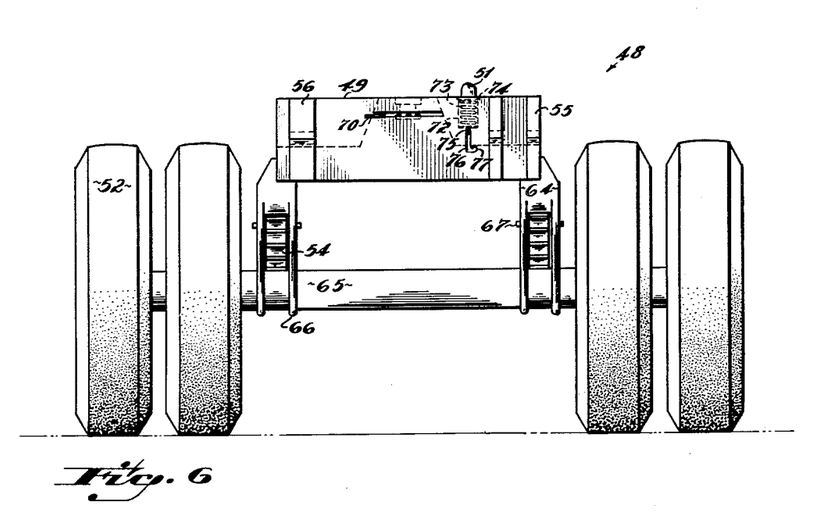
FIG. 6 is an end elevational view of an articulator.
Figure 7:
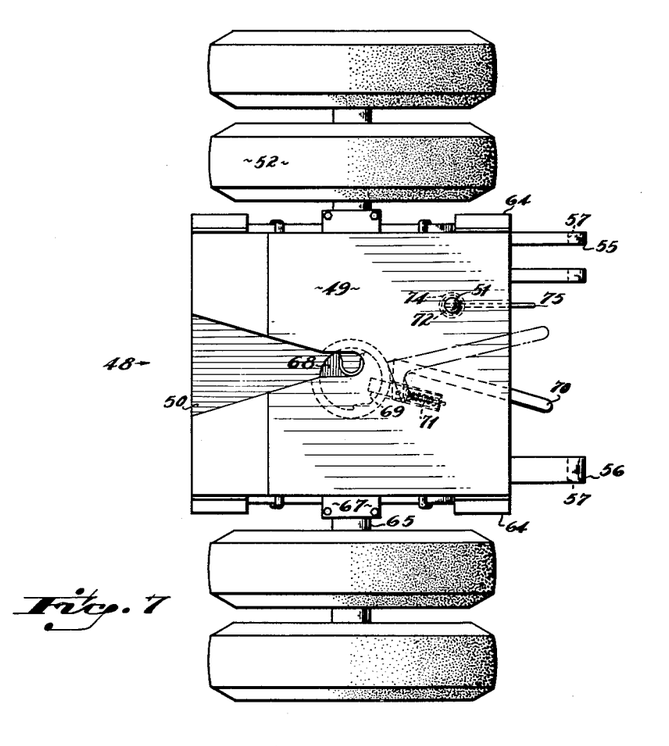
FIG. 7 is a top plan view thereof.
Figure 8:
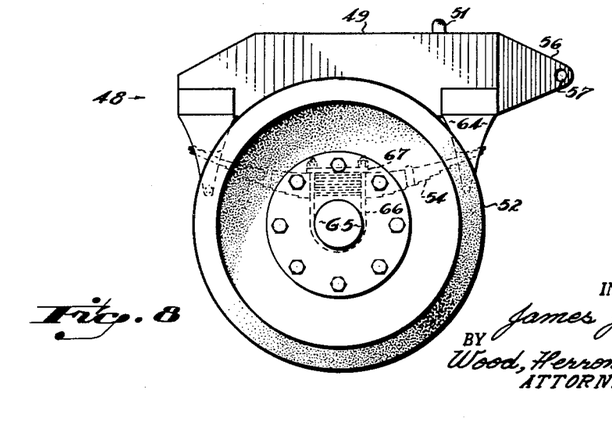
FIG. 8 is a side elevational view thereof.

One form of the articulator is illustrated in detail in FIGS. 6, 7 and 8. As shown in these figures, the fifth wheel 49 is supported on two pairs of wheels 52 by leaf spring suspensions 54 on each side of the fifth wheel. The springs are connected at their ends to the fifth wheel by means of the depending supports 64. A wheel axle housing 65 is clamped centrally of the springs by means of a U-bolt 66 and a plate 67 on each side of the articulator.

Referring particularly to FIG. 7, the slot 50 in the upper surface of the fifth wheel 49 which receives the kingpin of the trailer chassis has at the inner end thereof a locking member 68 which is engageable by the kingpin. When the locking member has been shifted to its proper position, it is fixed in such position by a bolt 69 actuated by a lever 70 against a compression spring 71. Referring to FIGS. 6 and 7, the pin 51 is slidably mounted in a bore 72 and spring biased by a compression spring 73 bearing against a collar 74 toward a projected position above the upper surface of the fifth wheel. A laterally projecting rod 75 fixed to the pin 51 is slidable in a J-shaped slot 76. The rod 75 can be drawn downwardly and fitted in a hook portion 77 of the slot 76 to fix the pin 51 in a retracted position below the upper surface of the fifth wheel.

Figure 9:
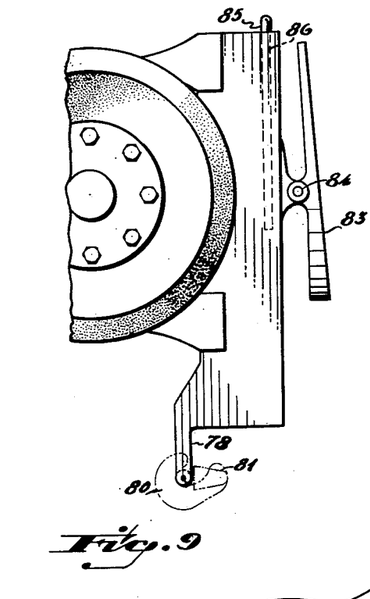
FIG. 9 is a side elevational view of an alternative embodiment of the articulator.
Figure 10:
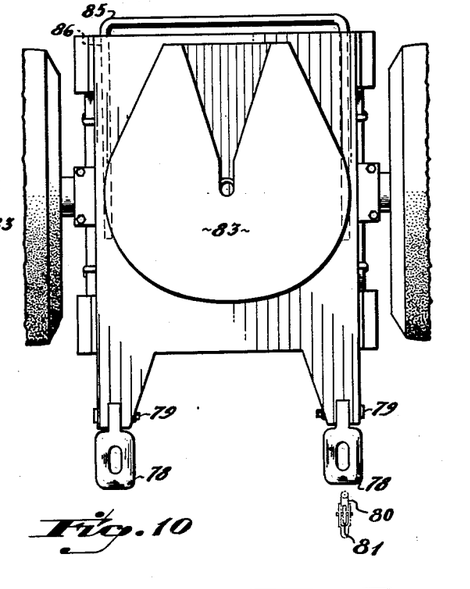
FIG. 10 is a top plan view of the articulator of FIG. 9.

In some instances, it may be necessary to permit vertical movement of one articulator with respect to its adjoining connected articulator. In such event, the embodiment of FIGS. 9 and 10 may be employed. In FIG. 10, the female and male connectors 55 and 56 may be replaced by link means or shackles 78 which are pivotally mounted on pins 79 to the articulator. The shackles cooperate with hooks 80 having locking members 81 mounted on an adjoining articulator. The two horizontal pivotal axes provided by the shackles 78 permit relative vertical movement between two trailers. Alternatively to the shackles 78, a fifth wheel indicated at 83 may be pivoted at 84 about a horizontal transverse axis. The pivotal mounting of the fifth wheel 83 permits angular movement of one trailer with respect to the adjoining trailer in a vertical plane.

A handle 85 may be slidably mounted in a slot 86 in the articulator. The handle is withdrawable to a limited extent to permit the articulator to be conveniently grasped and pulled to a desired position.

Figures 11, 13:
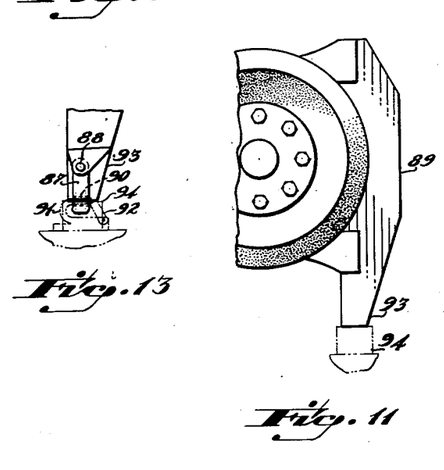
FIG. 11 is a side elevational view of a further alternative of the articulator.
FIG. 13 is a cross sectional view taken along lines 13—13 of FIG. 12.
Figure 12:
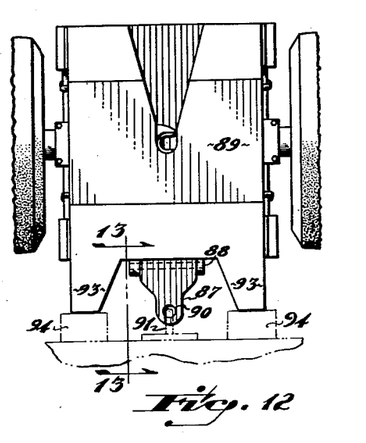
FIG. 12 is a top plan view thereof.

Still another embodiment of the articulator is illustrated in FIGS. 11 to 13. There a draw bar 87 is connected by a pin 88 to the fifth wheel structure 89. The forward end of the draw bar 87 has a hole 90 which cooperates with a hook 91 having a lock 92 as best illustrated in FIG. 13. The single point of connection of the draw bar 87 to the hook on an adjoining articulator introduces an undesirable vertical pivotal axis between two articulators. To eliminate this pivotal axis, abutting stabilizer members 93 are provided on each side of the draw bar, these stabilizing members cooperating with similar stabilizing members 94 fixed to the articulator of the towing vehicle.

*Second Form of the Invention*

In the first form of the invention described above, the chassis and container form an integral unit. Greater flexibility is obtainable through use of a form of the invention shown in FIGS. 14 through 19. In this form of the invention, the chassis indicated at 100 is a separate unit adapted to support two half length containers 101 or a full length container which would extend substantially the length of the chassis 100.

Figure 14:
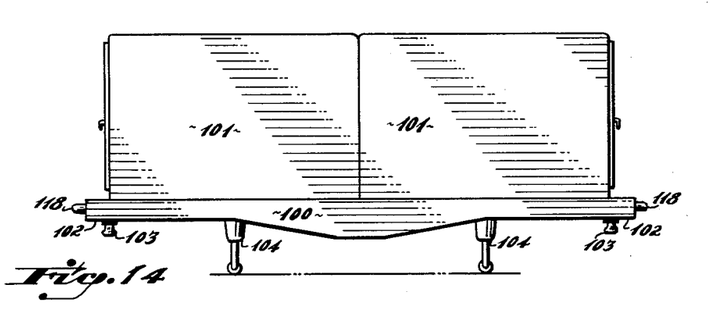
FIG. 14 is a side elevational view of the second form of my invention.
Figure 15:
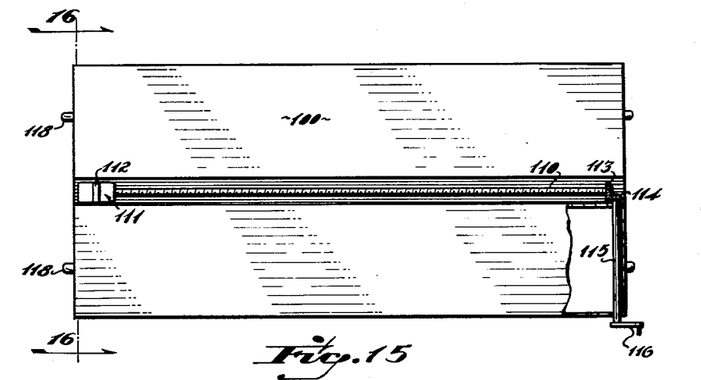
FIG. 15 is a top plan view thereof with the cargo containers removed.

The chassis has upper fifth wheel structures 102 at each end thereof, the upper fifth wheel structures having depending kingpins 103. The fifth wheels 102 and kingpins 103 cooperate with articulators of the type described above.

Adjacent each of the upper fifth wheels 102 are sets of adjustable landing gears 104 which are adapted to provide full support for the chassis and containers. The landing gears are extendable to elevate the chassis for the purposes described below and are retractable so as to clear roadway obstructions when the chassis is supported by articulators at each end. The articulators, as described above, are provided with pins which cooperate with holes in the upper fifth wheels 102 in order to permit the selected fixed or pivotal connection of the articulator to the chassis.

Figure 16:
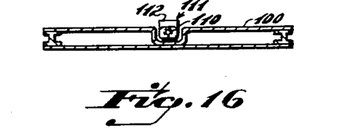
FIG. 16 is a cross sectional view taken along lines 16—16 of FIG. 15.

The chassis is provided with a conveyor as illustrated in FIGS. 15 and 16. The conveyor comprises an elongated screw 110 having a pusher 111 threadedly engaging the screw, the pusher having a projection 112 extending above the surface of the chassis. At one end of the screw is a bevel gear 113 which cooperates with a bevel gear 114 on a shaft 115, means at the end of the shaft are provided for rotating the shaft 115 and, through the beveled gears 113 and 114, rotating the screw 110 to move the pusher. The means for rotating the shaft 115 may be a crank 116 as shown or may be a motor.

Each end of the chassis is provided with aligning pins 118 which cooperate with sockets in structure such as a loading dock flat car or the like onto which containers 101 are to be loaded. Alternatively, the sockets could be in the trailer with cooperating pins in the structure onto which the containers are to be loaded.

In describing the operation of the second embodiment let it is assumed that the chassis 100 of FIG. 14 has cargo containers 101 positioned thereon with the doors of the cargo containers facing the ends of the chassis. The adjustable landing gears 104 maintain the chassis at a height sufficient to permit either a tractor fifth wheel or an articulator fifth wheel to be positioned under the fifth wheels 102 of the chassis and brought into locking engagement with the kingpins.

A tractor or other power unit can pick up an articulator from storage, bring it to one end of the chassis 102 and move it into operative engagement with the fifth wheel 102. Now if there are to be two drop off points for the respective cargo containers, the articulator should be positioned at the end of the chassis adjacent the container which is to be dropped off first. When the articulator is in position the pin 51 is elevated to fix the articulator against rotation with respect to the fifth wheel 102.

A tractor is brought up to the other end of the chassis and its fifth wheel moved into operative engagement with the fifth wheel 102 of the chassis. These steps having been taken, the adjustable landing gears 104 are retracted and the unit is ready for hauling as a tractor drawn semi-trailer.

Figure 17:
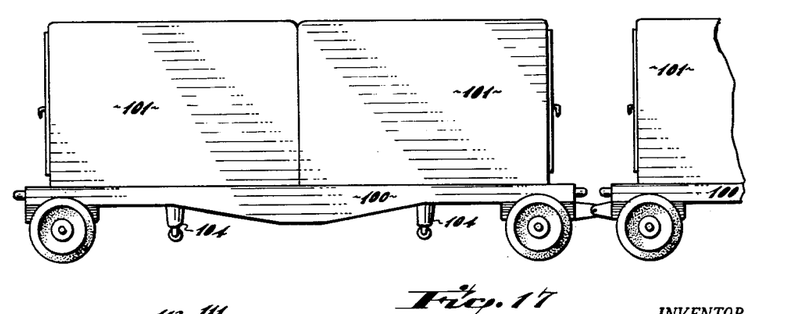
FIG. 17 is a side elevational view of the invention interconnected for a train combination.

If a train of trailers is to be drawn by the tractor, the additional trailers are provided with articulators at each end. The forward articulator is connected to the rearward articulator of the first chassis and its pin 51 remains in a retracted position so that pivotal movement of the second trailer with respect to its forward articulator is permitted. The rearward articulator, however, should be fixed in proper alignment with respect to the trailer by elevating the pin 51.

Figure 18:
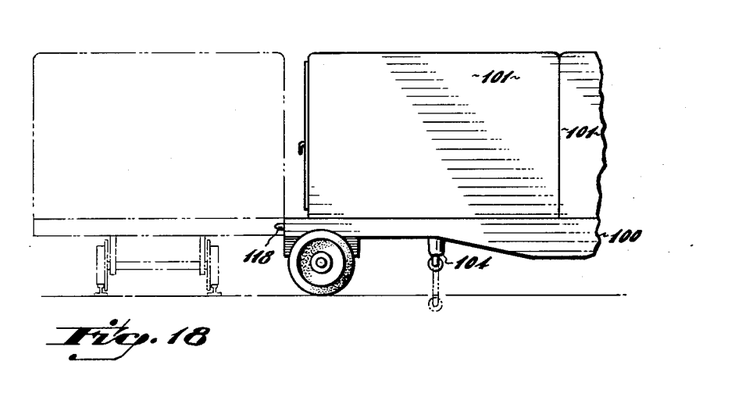
FIGS. 18 and 19 are diagrammatic views showing the operation of the invention.
Figure 19:
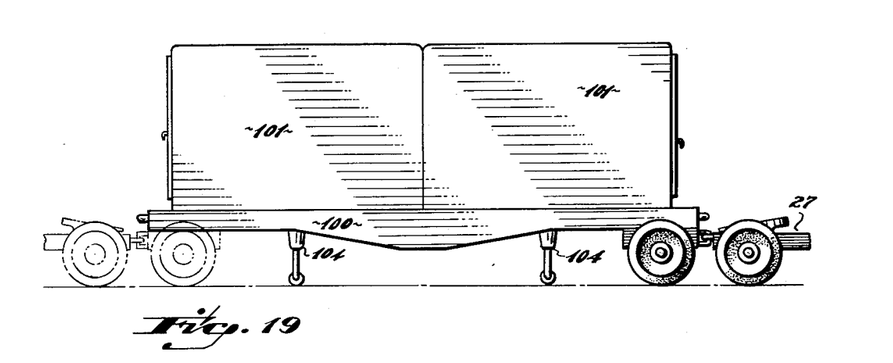

If the containers are to be transferred to a railway flatcar, the chassis is backed into engagement with the flatcar as shown in FIG. 18. The pins 118 at the end of the chassis cooperate with the sockets on the flatcar to fix the chassis 100 in proper alignment with the flatcar. If, because of terrain, variations in loading of the chassis and the like, proper alignment cannot be effected, the adjustable landing gear adjacent the end of the chassis 100 can elevate the chassis until proper alignment is effected.

When the chassis is in locked and aligned engagement with the flatcar, the conveyor which extends centrally of the chassis is operated to push the cargo containers onto the flatcar. After the first container has been pushed onto the flatcar, the chassis can be disengaged with respect to the flatcar shifted a distance approximately equal to the width of a cargo container. The chassis should again be brought into aligned locked engagement with the flatcar and the second cargo body shifted by means of the conveyor onto the flatcar.

In describing the containers, reference has been made to twenty foot containers and ten foot containers. The ten foot container can be positioned crosswise on the flatcar, and an eighty-four foot flatcar can accommodate eight such containers.

In another situation, the cargo containers could be unloaded at two different locations without removing them from the chassis. The first cargo container could be unloaded at the first destination. There, with the landing gears 104 extended to support the chassis, the tractor could be detached from one end of the chassis, be driven to the other end of the chassis to detach the articulator positioned at that end and return the articulator to the end of the chassis originally supported by the tractor. Having shifted the position of the articulator, the tractor could position its fifth wheel under the end of the chassis which had originally been supported by the articulator. Thus the direction of the trailer would be reversed thereby bringing the unloaded container to the rearward end of the chassis.

It should be understood that while there will be many applications for the use of two containers mounted on a single chassis, the invention lends itself to the use of a full size, for example twenty foot container mounted on the chassis.

It should also be understood that the invention with its removable containers is adapted to cooperate with a loading dock having a conveyor device by which the container can be removed from the chassis without requiring the use of the chassis conveyor.

It should also be understood that the articulator may be used to connect a semi-trailer in tandem with a standard semi-trailer by providing means for connecting the articulator to the rear end of the standard semi-trailer in such a manner as to maintain the axle of the articulator in substantially parallel relation to the axle of the forward semi-trailer.

I claim:

1. A pair of articulators for roadway vehicles each comprising, a lower fifth wheel having a slot therein to receive a kingpin, an axle secured to said lower fifth wheel, tired wheels at the respective ends of said axle, and disconnectible means on each said articulator on one side of said axle for connecting said articulators together, said disconnectable means including two laterally spaced elements engageable with said similar articulator for maintaining the axles of respective articulators in substantially parallel relation.

2. A pair of articulators for roadway vehicles each comprising, a lower fifth wheel having a slot therein to receive a kingpin, an axle secured to said lower fifth wheel, tired wheels at the respective ends of said axle, spaced male and female connectors on said articulator at one side of said axle connecting said articulators together.

3. A pair of articulators for roadway vehicles each comprising a base, a lower fifth wheel pivoted about a horizontal axis to said base, said fifth wheel having a slot therein to receive a kingpin, a pin spaced from said slot and projectable above the plane of said fifth wheel for engagement with an upper fifth wheel, an axle secured to said base on an axis parallel to said fifth wheel pivotal axis, and tired wheels at the respective ends of said axle, and disconnectable means on said articulator on one side of said axle connecting said articulators together, said disconnectable means including two laterally spaced elements on each said articulator in cooperative interconnection for maintaining the axles of respective articulator in substantially parallel relation.

4. A pair of articulators for roadway vehicles each comprising a base, a lower fifth wheel mounted on said base for pivotal movement about a transverse axis, said fifth wheel having a slot therein to receive a kingpin, a pin spaced from said slot and projectable above the plane of said fifth wheel for engagement with an upper fifth wheel, an axle secured to said base on an axis parallel to said fifth wheel pivotal axis, tired wheels at the respective ends of said axle, and disconnectable means on said articulator on one side of said axle connecting said articulators together, said disconnectable means including two laterally spaced elements on each said articulator in cooperative interconnection for maintaining the axles of respective articulator in substantially parallel relation.

5. A pair of articulators for roadway vehicles each comprising, a lower fifth wheel having a slot therein to receive a kingpin, an axle secured to said lower fifth wheel, tired wheels at the respective ends of said axle, a central connector on each said articulator at one side of said axle for connecting said articulators together, and cooperating interconnection means on each side of said connector of each articulator to block angulation of said articulators in a horizontal plane.

6. A pair of articulators for roadway vehicles each comprising, a lower fifth wheel having a slot therein to receive a kingpin, an axle secured to said lower fifth wheel, tired wheels at the respective ends of said axle, a pair of spaced links pivoted on horizontal axes on at least one of said articulators at one side of said axle to form a coupling with the other articulator, said links permitting limited vertical movement of said articulators with respect to each other while blocking horizontal angulation of said articulators.

7. Tandem transporting apparatus comprising at least two aligned chassis, cargo bodies on said chassis, each said chassis having an upper fifth wheel and kingpin at each end thereof, a tractor vehicle having a lower fifth wheel in supporting engagement with the upper fifth wheel in the forward chassis, articulators in supporting engagement with the remaining upper fifth wheels, the adjacent articulators of respective chassis being coupled for pivotal movement about a horizontal axis and fixed against pivotal movement about a vertical axis, and means fixing the rearward articulator of each chassis against pivotal movement with respect to its chassis about a vertical axis.

8. Tandem transporting apparatus comprising at least two aligned chassis, cargo bodies on said chassis, each said chassis having an upper fifth wheel and kingpin at each end thereof, landing gears adjacent one fifth wheel of each said chassis, a tractor vehicle having a lower fifth wheel in supporting engagement with the upper fifth wheel in the forward chassis, articulators in supporting engagement with the remaining upper fifth wheels, the adjacent articulators of respective chassis being coupled for pivotal movement about a horizontal axis and fixed against pivotal movement about a vertical axis, and means fixing the rearward articulator of each chassis against pivotal movement with respect to its chassis about a vertical axis.

9. Tandem transporting apparatus comprising at least two aligned chassis, cargo bodies on said chassis, each said chassis having an upper fifth wheel and kingpin at each end thereof, landing gears adjacent each fifth wheel of each chassis, a tractor vehicle having a lower fifth wheel in supporting engagement with the upper fifth wheel in the forward chassis, articulators in supporting engagement with the remaining upper fifth wheels, the adjacent articulators of respective chassis being coupled for pivotal movement about a horizontal axis and fixed against pivotal movement about a vertical axis, and means fixing the rearward articulator of each chassis against pivotal movement with respect to its chassis about a vertical axis.

10. Transportation apparatus comprising, a tractor having a lower fifth wheel, a first semi-trailer having a fixed rear wheeled suspension and a forward upper fifth wheel and king pin in engagement with said tractor fifth wheel, a tandem semi-trailer having a fixed rear wheeled suspension and a forward upper fifth wheel and king pin, an articulator having a lower fifth wheel in engagement with the upper fifth wheel of said tandem semi-trailer, and cooperating connecting means on the rear of said first semi-trailer and said articulator for maintaining the axle of said articulator in substantially parallel relation to the axle of the first semi-trailer during all phases of movement of the trailers over a roadway.

11. Roadway transportation apparatus comprising, a tractor having a lower fifth wheel, a first vehicle having a fixed rear wheeled suspension and a forward upper fifth wheel and king pin in engagement with said tractor fifth wheel, a second vehicle having a fixed rear wheeled suspension and a forward upper fifth wheel and king pin, an articulator having a lower fifth wheel in engagement with the upper fifth wheel of said second vehicle, and cooperating connecting means on the rear of said first semi-trailer and said articulator for maintaining the axle of said articulator in substantially parallel relation to the axle of the first semi-trailer during all phases of movement of the trailers over a roadway.

12. Roadway transportation apparatus comprising, a tractor having a lower fifth wheel, a first vehicle having a fixed rear wheeled suspension and a forward upper fifth wheel and king pin in engagement with said tractor fifth wheel, a second vehicle having a fixed rear wheeled suspension and a forward upper fifth wheel and king pin, an articulator having a lower fifth wheel in engagement with the upper fifth wheel of said tandem semi-trailer, and cooperating connecting means including laterally spaced link means interconnecting the rear of said first semi-trailer and said articulator for maintaining the axle of said articulator in substantially parallel relation to the axle of the first semi-trailer during all phases of movement of the trailers over a roadway.

References Cited in the file of this patent

UNITED STATES PATENTS

| | | |
|---|---|---|
| 458,200 | Thompson | Aug. 25, 1891 |
| 1,243,636 | Schulz | Oct. 16, 1917 |
| 2,010,969 | Soulis | Aug. 13, 1935 |
| 2,167,231 | Blackmore | July 25, 1939 |
| 2,333,853 | Fellabaum | Nov. 9, 1943 |
| 2,460,466 | Nogle | Feb. 1, 1949 |
| 2,466,938 | Evans et al. | Apr. 12, 1949 |
| 2,590,962 | Gurton et al. | Apr. 1, 1952 |
| 2,656,196 | Fellabaum | Oct. 20, 1953 |
| 2,787,971 | Obes | Apr. 9, 1957 |
| 2,816,776 | Nimtz | Dec. 17, 1957 |
| 2,982,563 | Gregg | May 2, 1961 |
| 2,986,408 | Black | May 30, 1961 |
| 3,004,772 | Bohlen et al. | Oct. 17, 1961 |

FOREIGN PATENTS

| | | |
|---|---|---|
| 511,539 | France | Sept. 25, 1920 |
| 677,022 | France | Dec. 7, 1929 |